United States Patent [19]

Lenke et al.

[11] 4,414,362

[45] Nov. 8, 1983

[54] PREPARATION OF POLYAMIDES

[75] Inventors: Gerd M. Lenke, Mogadore; Hubert J. Fabris, Akron, both of Ohio

[73] Assignee: The General Tire & Rubber Company, Akron, Ohio

[21] Appl. No.: 354,838

[22] Filed: Mar. 4, 1982

[51] Int. Cl.³ ............................................. C08G 69/14
[52] U.S. Cl. .................................. 525/178; 525/184; 528/313; 528/314; 528/323; 528/326
[58] Field of Search .................... 525/178, 183, 184; 528/313, 314, 315, 323, 325, 326

[56] References Cited

U.S. PATENT DOCUMENTS

| | | | |
|---|---|---|---|
| 3,028,369 | 4/1962 | Butler | 528/323 |
| 3,134,746 | 5/1964 | Grabowski | 525/184 |
| 3,218,371 | 11/1965 | Grabowski | 525/183 |
| 3,887,643 | 6/1975 | Selman | 528/323 |
| 4,018,731 | 4/1977 | Sims | 525/184 |

*Primary Examiner*—Paul R. Michl

[57] ABSTRACT

Polyamides from lactams are prepared by the reaction of an initiator compound, a liquid hydroxy containing nitrile copolymer and a lactam using as a catalyst a minor amount of a lactam anionic polymerization catalyst. The resulting polyamides exhibit high impact strength and improved dimensional stability or reduced sensitivity to dimensional change upon exposure to a high humidity environment.

6 Claims, No Drawings

PREPARATION OF POLYAMIDES

This invention relates to the preparation of polyamides from lactams and exhibiting high impact strength and improved resistance to water absorption.

OBJECTS

An object of this invention is to provide a process for the preparation of polyamides from lactams.

Another object of this invention is to provide novel polyamides from lactams and exhibiting high impact strength and improved resistance to water absorption.

These and other objects and advantages of the present invention will become more apparent to those skilled in the art from the following detailed description and working examples.

SUMMARY OF THE INVENTION

According to the present invention it has been found that solid polyamides, including polylactam block copolymers, can be prepared by reacting a liquid hydroxy containing nitrile copolymer and a lactam monomer with a minor amount of an initiator and an anionic lactam polymerization catalyst. The lactam monomer is used in a substantially greater molar amount than the initiator and copolymer. These nylon 6 type materials, polycondensates of lactams, exhibit improved impact strength. By suitable techniques the process is amenable to forming polyamides by RIM.

Diene oligomers or low molecular weight diene polymers with terminal hydroxyl groups have been mentioned as compounds for lactam polymers, for example, to improve impact strength of Nylon 6 type polyamides. Unfortunately, such diene oligomers have a very limited solubility in caprolactam melts. Even if a small portion of such diene oligomers or polymers may be soluble in the molten caprolactam monomer, these oligomers tend to phase separate during the polycondensation of the lactam and, thus, are not properly chemically incorporated into the overall molecular structure. However, in case of nitrile groups present in the diene oligomers or polymers of the present invention, for example, from about 5 to 40 parts by weight of the nitrile copolymerized with the 1,3-butadiene, there is believed to be sufficient compatibility with the caprolactam monomer, and substantially no macroscopic phase separation occurs during the polymerization. The nitrile group bearing oligomers or copolymers are chemically incorporated into the overall molecular structure and the resultant polymers not only exhibit high impact strength but also excellent water resistance. Nitrile groups are apparently unique, because they provide high polarity without interfering in the polymerization process or negatively affecting the water resistance of the final polyamide. The polyamide contains copolymerized with it from about 5 to 40 parts by weight of the nitrile copolymer.

DISCUSSION OF DETAILS AND PREFERRED EMBODIMENTS

The initiator used in the practice of the present invention can be any of the well known initiators for lactam polymerization having the general formula (I):

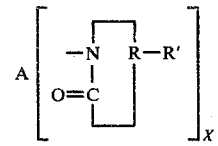

where A is B(NHCO)$_X$, B(CO)$_X$, —CO—, —SO$_2$—, —CS—,

B(CS)$_X$, B(SO$_2$)$_X$ and B(PO)$_{X/2}$ where B is a C$_4$ to C$_{30}$, or preferably a C$_6$ to C$_{15}$, hydrocarbon radical selected from the group consisting of alkylene, cycloalkylene, alkcycloalkylene, arylene, alkarylene and aralkylene radicals and mixtures thereof, where X is 2 to 4, where R is an alkylene radical of from 4 to 11 carbon atoms and where R' is hydrogen or an alkyl radical of from 1 to 4 carbon atoms. Mixtures of these initiator compounds can be used.

A preferred initiator compound is prepared by reacting a polyisocyanate with a lactam in an excess of the lactam or mixtures of said lactams. In other words a molar excess of the lactam is used as compared to the polyisocyanate to provide complete reaction of the polyisocyanate with the lactam and to provide a solvent or dispersant medium for the urea compound obtained. The polyisocyanate should have at least two —NCO groups and can be 2,4-tolylene diisocyanate, 2,6-tolylene diisocyanate, crude TDI, 4,4'-diphenylmethane diisocyanate, hydrogenated 4,4'-diphenylmethane diisocyanate (dicyclohexylmethane diisocyanate), polymeric forms of MDI and hydrogenated MDI, xylene diisocyanate, isophorone diisocyanate, hexamethylene diisocyanate, trimethyl hexamethylene diisocyanate and the like and mixtures of the same. Of these polyisocyanates it is preferred to use 4,4'-diphenylmethane diisocyanate or hydrogenated 4,4'-diphenylmethane diisocyanate or mixture thereof. Polyurethane catalysts such as stannous octoate, stannous oleate, dibutyl tin dilaurate and the like and mixtures thereof may be used to facilitate the reaction between the polyisocyanate and the lactam. The resulting urea compound or initiator has the above formula I where A=B(NHCO)$_X$.

Other initiators can be prepared by procedures described in U.S. Pat. No. 3,862,262 (Ex. 1 or 2) or U.S. Pat. No. 4,031,164 (Ex. 1).

The liquid nitrile copolymer is prepared by reacting a nitrile and a conjugated diene in bulk or in a solvent or diluent at a temperature of from about 90° to 130° C. with hydrogen peroxide as a catalyst to provide a liquid nitrile copolymer having an average of from about 2 to 3 hydroxyl groups per molecule and an average molecular weight of from about 1,500 to 10,000. The hydrogen peroxide may be used in an amount of from about 1 to 10% by weight of the reaction mixture. The copolymerization, of course, should be done under inert conditions. The nitrile is acrylonitrile and/or methacrylonitrile, acrylonitrile being preferred. The conjugated diene used has from 4 to 6 carbon atoms and is selected from the group consisting of butadiene-1,3, isoprene, 2,3-dimethyl butadiene-1,3, and piperylene and mixtures thereof. Butadiene-1,3 is preferred. The monomers are copolymerized to provide a copolymer of from about 95 to 60 parts by weight of the conjugated diene and from 5 to 40 parts by weight of the nitrile. Minor amounts by weight of other copolymerizable monomers may be copolymerized with the nitrile monomer and the conjugated diene monomer so long as they do not adversely affect the properties of the liquid nitrile copolymer or of the resulting polyamide. Examples of such copolymerizable monomers are the acrylates, methacrylates and styrenes. A method for making liquid nitrile-diene containing polyols is disclosed in U.S. Pat. No. 3,714,110. Mixtures of the liquid nitrile copolymers may be used.

The lactam monomer, used in the process of the present invention to form the bulk of the polyamide, has the formula

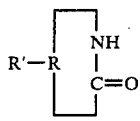

where R is an alkylene radical of from 4 to 11 carbon atoms and R' is hydrogen or an alkyl radical of from 1 to 4 carbon atoms. Mixtures of these lactams can be used. Examples of suitable lactams are epsilon caprolactam, valerolactam, enantholactam, caprylolactam, nonanolactam, decanolactam, dodecanolactam, 3-methyl caprolactam, 4-isopropyl caprolactam and the like. It is preferred to use epsilon caprolactam.

The anionic lactam polymerization catalyst (lactamate salt) can be formed in situ by reaction of a metal or metal compound with the lactam monomer in the polymerization medium or by prior reaction of the metal or metal compound with a stoichiometric quantity of or in an excess of the lactam monomer which is then added to the polymerization medium. Examples of metal or metal compounds which can be used include Li, Na, K, Mg, Ca, R"MgBr, R"MgCl or R"MgI (where R" is an alkyl group of 1 to 3 carbon atoms) like ethyl magnesium bromide or other Grignard reagents, sodium phenyl, sodium hydride, n-butyl lithium, alkali metal alkoxides, such as sodium methoxide, and so forth and mixtures thereof. Preferred materials are ethyl magnesium bromide or butyl lithium. The metal or metal compound may be supplied as a dispersion or solution in a suitable dispersant or solvent such as an ether like diethyl ether to the lactam or polymerization medium. The catalyst, thus, has the formula

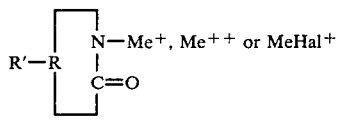

where Me+, Me++ or MeHal+ is a metal or metal halide cation (e.g. MgBr+), respectively, as shown above and R' and R have the significance as defined above. Examples of such catalysts are sodium caprolactam, bromomagnesium caprolactam (sodium caprolactamate, bromo-magnesium caprolactamate) and the like. Mixtures of catalysts may be used.

The lactam monomer used to form the anionic lactam polymerization catalyst and for the bulk of the polyamide falls within the scope of the above lactam monomer formula, whether being the same or different or mixture thereof.

The anionic lactam polymerization catalyst in general is used in a minor amount as compared to the initiator compound, the hydroxy containing liquid nitrile copolymer and the monomeric lactam and sufficient to form a solid polyamide; preferably the anionic lactam polymerization catalyst is used in the range of from about 1 to 20 meq., preferably from about 5 to 15 meq., of lactamate anion per 100 grams of total reactants, e.g., the initiator compound, the hydroxy containing liquid nitrile copolymer and the lactam monomer. The equivalent ratio of the lactamate anion of the anionic lactam polymerization catalyst to the initiator compound should be from about 0.1:1 to 1:1, preferably from about 0.3:1 to 1:1. The equivalent ratio of the initiator compound to the hydroxy groups of the liquid nitrile copolymer should be from about 0.8:1 to 4:1, preferably from about 1:1 to 3:1. The lactam monomer is used in the reaction mixture or polymerization medium in a substantially greater molar amount than the molar amounts of the initiator compound and the hydroxy containing liquid nitrile copolymer. The liquid hydroxy containing nitrile copolymer is used in an amount sufficient to provide from about 5 to 40% by weight of the nitrile copolymer copolymerized in the resulting polyamide, e.g., the polyamide should contain from about 5 to 40% by weight of copolymerized nitrile copolymer.

All of the reactants should be dry and/or stripped of water, solvent and dispersant prior to use or before final injection into a mold and polymerization. All of the reactants should be prepared under dry or inert conditions, and polymerization should be conducted under the same conditions.

During molding (compression, injection, transfer etc.) temperatures for molding may be in the range of from about 80° to 210° C., preferably from about 125° to 195° C. Temperatures, of course, may vary depending on the type of lactam or lactams being employed. During molding, pressures may range from about 0.9 to 100, preferably from about 1 to 50, Kp/cm², and times may range from 1 to 120 minutes.

Methods of making the polyamides of the present invention can vary. The molten lactam, the nitrile compound, the initiator and the lactamate catalyst can be mixed and charged to a mold. The catalyst can be preformed separately by addition of a metal or metal compound, e.g. a Grignard solution, to a molten lactam (preferably an excess of lactam is used as diluent). Alternatively, the catalyst can be formed "in situ" by addition of a Grignard solution to a molten mixture of all of the other reactants. The initiator, as well as the nitrile compound, may be charged after the catalyst, but preferably the catalyst is added (or formed in situ) last. Still another method is to make the initiator in situ by adding a di- or polyisocyanate to the molten lactam which may or may not contain the nitrile polymer. As soon as substantially all of the isocyanate groups are consumed, the other ingredients can be added in any fashion as described above.

A convenient method of making the polyamides of the present invention is to utilize a so-called "reaction injection molding" (RIM) technique (D. J. Prepelka and J. L. Wharton, J. Cellular Plastics, March-April 1975, p. 87). In this case two streams of molten lactam, one containing the catalyst and the other the nitrile compound and the initiator, are mechanically mixed in a mixing head or chamber and injected into a preheated mold. Modifications of this process, as well as other methods, can be utilized to prepare the polyamide.

Optionally, the polymer compositions of this invention may be reinforced by incorporation of chemically inert particulate fillers, fibrous materials, or a combination of both. Examples of particulate fillers are: milled glass fibers, mica, wollastonite, mullite, silica, quartz and feldspar. Examples of fibrous materials are: chopped glass fibers, woven or non-woven glass fiber mats. Particulate fillers are dispersed in the monomeric melt or one of the reactants. Preformed glass mats can be placed in the empty mold prior to charging. Preferred are the glass fibers such as the milled glass fibers, chopped glass fibers, glass strands or yarns and woven or non-woven glass fiber mats, and they can be used in an amount up to about 35%, preferably up to about 25%, by weight of the polymeric composition. Other additives can be mixed with the monomeric melt or one of the reactants such as pigments, dyes, stabilizers, antioxidants, fire or flame retardants, lubricants, delustering agents and other thermoplastics and rubbers. All of these added materials should be treated or stripped to remove moisture, solvents and so forth which might adversely affect the polymerization reaction or the resulting polyamide.

The polyamides produced by the method of the present invention may be used in the manufacture of gears, wheels, foams, bushings, couplings, parts of casings, fan rotors, links for conveyor chains, fibers, furniture parts, automobile and truck parts and wherever high impact strength dimensionally stable polyamide products are desired. The process of the present invention may be particularly useful in a RIM (Reaction Injection Molding) process.

The following examples will serve to illustrate the present invention with more particularity to those skilled in the art. Parts are parts by weight unless otherwise noted.

EXAMPLE 1

A. 330 g of epsilon-caprolactam were melted in a closed vessel and 45 g were stripped off under vacuum to remove traces of moisture. Starting at 75° C., 130 g of hydrogenated 4,4'-diphenylmethane diisocyanate were added from a dropping funnel containing 3-4 drops of stannous octoate. The temperature rose to 140° C. After the temperature had fallen to 95° C., the reaction mixture was heated 2 hours at 85°-110° C. to ensure complete reaction. An IR probe indicated no free NCO remained. When the melt was cooled to 75° C., it became necessary to add 200 ml toluene to reduce the viscosity. The reaction product, a fine snow-white powder, was separated from the toluene by filtration. The yield of the vacuum dried final product was 185 g. The product showed a sharp melt endotherm at 179° C. (by DSC); decomposition started above 190° C. (TGA). Reaction of a portion of the product with n-dibutylamine in solution indicated 3.7 meq blocked NCO/g product (90% of theory). This urea compound or bisurea is used in the following polymerization as initiator-building block.

B. A mixture of:
 200 g epsilon-caprolactam,
 45 g liquid poly (Bd/AN) diol (average MW 4500; 0.6
 meq. OH/g) (a) and
 1 g SANTOWHITE Powder (b)

was heated above melt temperature of caprolactam. Ca. 65 g (mostly caprolactam) were stripped off (at 80° to 95° C.) under vacuum to remove water and other volatiles. To the remaining clear melt was added 15 g of Preparation A above containing the urea compound or initiator prepared from hydrogenated MDI and caprolactam. As soon as the urea compound had dissolved, the melt (75° C.) was degassed under vacuum.

C. A catalyst solution in molten caprolactam separately was prepared by mixing together:
 100 g epsilon-caprolactam and
 10 ml of a 3.2 molar solution of ethyl magnesium bromide in diethylether (Grignard reagent or solution)

The Grignard reagent reacted instantly. Most of the ethane and diethyl ether was blown out with dry nitrogen. Finally, the reaction mixture was degassed under vacuum for about ca. 8 minutes at about 75° C.

D. The melt (C) containing the catalyst was added to the batch (B) containing the caprolactam, poly (Bd/AN) and urea initiator. After mixing, the resulting melt (ca. 80° C.) was poured into TEFLON coated steel sheet molds (⅛ inch thickness), preheated to 100° C. The closed molds were heated in an oven at 145° C. for 1 hour to effect polymerization. After cooling to RT (room temperature, about 25° C.) the resulting polyamide sheets were demolded. The resulting polyamide contained about 15% by weight of combined butadiene-acrylonitrile copolymer. A sample of the polyamide was extracted with boiling water in a Soxhlet for 48 hours. The weight loss of the polyamide was only 1.1%, indicative of virtually complete polymerization.

The polyamide sheets had a homogeneous appearance; they were stiff but tough with a smooth and hard surface. The following properties were determined (dry as made, unless otherwise indicated) on the molded polymer sheets:

| | |
|---|---|
| Hardness (Shore D) | 84 |
| Gardner Impact | >13.3* ft. lbs. (no cracks or crazes) |
| Tensile Strength | 8200 psi |
| Yield Strength | 8700 psi |
| Elongation (at break) | 110% |
| Flexural Strength | $1.4 \times 10^4$ psi |
| Flexural Modulus | $3.0 \times 10^5$ psi |
| Notched Izod | 15 ft. lbs./per inch of notch |
| (50% rel. humidity) | (hinged break) |

*Approximate upper limit of test apparatus.

EXAMPLE 2

The procedure given in Example 1, above, was simplified by adding the Grignard reagent to the total charge, thus preparing the catalyst "in situ", in the presence of all the other ingredients. Total charge:
 300 g epsilon-caprolactam (45 g stripped off)
 45 g Poly (Bd/AN) diol (a)
 1 g SANTOWHITE Powder (b)
 15 g Urea compound or initiator (same as Example 1)
 7 ml Grignard solution (same as Example 1) were added after the initiator was totally dissolved in the other ingredients. After degassing at 80° C. under vacuum, the clear melt was transferred into preheated molds (110° C.). One of the molds contained a non-woven glass fiber mat for reinforcement. After 15 min. at 145° C., the molds were allowed to cool to RT. Again, polymerization was quite complete (only 0.46% extracted with boiling water after 48 hours) and the sheets had good appearance and properties (Gardner Impact >13.3 ft. lbs.). The glass mat was quite well incorporated in the polyamide. The polyamide contained about 15% of copolymerized nitrile copolymer.

EXAMPLE 3

A material with ca. 20 wt % Poly (Bd/AN) was made following the procedure in Example 1, above. Total charge:
    230 g epsilon-caprolactam (after stripping)
    60 g Poly (Bd/AN) (a)
    1 g SANTOWHITE Powder (b)
    20 g bisurea initiator (same as in Example 1)
    10 ml Grignard solution (same as Example 1)

The mixture was in-mold polymerized at 150° C. for ca. half an hour. The resulting polymer sheets had good properties and appearance.

| | |
|---|---|
| Shore D Hardness | 83 |
| Gardner Impact | >13.3 ft. lbs. (no cracks or crazes) |
| Tensile Strength | 6900 psi |
| Elongation (at break) | 404% |
| Flexural Strength | $1.1 \times 10^4$ psi |
| Flexural Modulus | $2.9 \times 10^5$ psi |
| Notched Izod (50% rel. humidity) | 14 ft. lbs./per inch of notch (hinged break) |

EXAMPLE 4

A polyamide was made with 15% by weight of a liquid poly (Bd/AN) diol containing only 10% by weight of AN (average MW of 3800; 0.58 meq. OH/g) (c).

The general procedure of Example 1, above, was employed.
Total charge:
    250 g epsilon-caprolactam (after stripping),
    45 g Poly (Bd/AN).
    10 MDI (4,4'-diphenylmethane diisocyanate) (d) and
    12 ml of Grignard solution (same as in Example 1, above).

In this example the initiator was made "in situ" by reacting the MDI with the caprolactam in the charge and, also, done to overcome any residual impurities in the butadiene 1,3/acrylonitrile copolymer such as predominately free carboxyl groups. The Grignard solution was added after all the isocyanate was reacted. An acceptable polyamide was obtained. The resulting polymer had a surface hardness of 80 (Shore D) and a Gardner impact strength of >13.3 ft. lbs.

EXAMPLE 5

Control. This run demonstrates that polycaprolactams containing no poly (Bd/AN) modifiers exhibit very poor impact strength and water resistance.

From a melt of 300 g epsilon-caprolactam containing 1 g SANTOWHITE powder was stripped off 45 g to assure dryness. 10 g of the urea compound (initiator used in Example 1) was added to the melt. After the urea compound dissolved in the melt, 5 ml of Grignard solution (same as Example 1, above) were added. The mixture was in-mold polymerized as described in Example 2, above.

The resulting polymer sheet had a shore D surface hardness of about 86, but its impact strength was extremely low:

| | |
|---|---|
| Gardner Impact | <4 inch lbs. (0.33 ft. lb.) (shattered) |
| Notched Izod (50% rel. humidity) | 0.7-1 ft. lb./per inch of notch (broke) |
| Elongation at break | 3-5% |

EXAMPLE 6

The rates of water absorption in wt % versus time of ⅛ inch thick polyamide sheets immersed in water at RT are shown in Table I, below. While Nylon 6, polyepsilon caprolactam, control (Example 5 material) absorbs over 6 wt. % water in 3 days, the material containing 15 wt % copolymerized poly (Bd/AN) has a weight gain of only 1.4% and after 1 week 2.4% versus 9.4% for the Nylon 6 control. Polyepsilon caprolactams modified with other polyols, e.g., polypropylene ether glycols or polytetramethylene ether glycols, absorb water at a slower rate than the control, however, generally still much faster than the material containing the copolymerized Bd/AN oligomer or copolymer.

Dimensional expansion of ⅛ inch thick polyamide sheets, immersed in water, is even more drastically reduced in case of the material with poly (Bd/AN) compared to the Nylon 6 control and the PPG-2000 Modified Nylon, Table I, below.

Also, at 50% relative humidity the typical weight increase (from dryness) of the poly Bd/AN modified Nylon is less than 1% after 4 weeks; linear expansion is practically zero, even after 6 weeks, as compared to 0.7 to 1.1% after 2 weeks for Nylon 6 with 20% PPG-2000.

TABLE I

Changes of Weight and Dimensions* at 100% Relative Humidity (RT)
(Immersed in Water)
(Polyepsilon caprolactams made by process of present invention except as noted)

| Wt. % Polyol Copolymerized in Polyamide | 3 Days | | 1 Week | | 2 Weeks | | 4 Weeks | | 6 Weeks | |
|---|---|---|---|---|---|---|---|---|---|---|
| | Wt. % | $\frac{\Delta(l + w)\%}{2}$ | Wt. % | $\frac{\Delta(l + w)\%}{2}$ | Wt. % | $\frac{\Delta(l + w)\%}{2}$ | Wt. % | $\frac{\Delta(l + w)\%}{2}$ | Wt. % | $\frac{\Delta(l + w)\%}{2}$ |
| Control, Nylon 6, (no polyol) | 6.1 | 3.3 | 9.4 | 3.3 | 12.3 | 3.3 | 12.2 | 3.3 | 13.2 | 3.3 |
| 10 PPG 2200 (e) | 3.1 | 1.7 | 5.1 | 4.55 | 7.7 | 3.85 | 8.2 | ? | 7.7 | 2.9 |
| 15 PPG 2200 (e) | 4.3 | 0.5 | 6.3 | 1.1 | 8.0 | 1.3 | 8.6 | 1.3 | 8.0 | 1.3 |
| 20 PPG 2200 (e) | 4.5 | 0.5 | 6.9 | 1.0 | 7.6 | 2.65 | 7.9 | 2.65 | 7.6 | 2.65 |
| 20 Poly(THF)-2000 (f) | 4.6 | 0.8 | 6.4 | 1.6 | 6.1 | 2.25 | 5(?) | 1.35 | 5.5 | 1.35 |
| 20 Poly(THF)-3000 (f) | 3.1 | 0 | 5.4 | 1.55 | 6.5 | 1.8 | 6.5 | 1.95 | 6.4 | 2.2 |
| 15 Poly(Bd/AN) (a) | 1.4 | 0 | 2.4 | 0.55 | 4.2 | 0.55 | 5.9 | 0.7 | 5.9 | 0.8 |

TABLE I-continued

Changes of Weight and Dimensions* at 100% Relative Humidity (RT)
(Immersed in Water)
(Polyepsilon caprolactams made by process of present invention except as noted)

| Wt. % Polyol Copolymerized in Polyamide | 3 Days Wt. % | $\frac{\Delta(l + w)\%}{2}$ | 1 Week Wt. % | $\frac{\Delta(l + w)\%}{2}$ | 2 Weeks Wt. % | $\frac{\Delta(l + w)\%}{2}$ | 4 Weeks Wt. % | $\frac{\Delta(l + w)\%}{2}$ | 6 Weeks Wt. % | $\frac{\Delta(l + w)\%}{2}$ |
|---|---|---|---|---|---|---|---|---|---|---|
| Ca. 10 PolyBd (g)(h) | 2.0 | 0 | 3.3 | 0 | 5.3 | 0.55 | 8.2 | 2.0 | 8.2 | 2.0 |

$\frac{*\Delta l + \Delta w}{2}$  $\Delta l$ = difference in length
$\Delta w$ = difference in width Notes for above Examples:
(a) Butadiene-acrylonitrile copolymer containing about 15% by weight of acrylonitrile; contains primary OH; Poly Bd Liquid Resin CN-15, Arco Chemical.
(b) 4,4'-butylidenebis (6-t-butyl-m-cresol); Monsanto, Rubber Chemicals Division.
(c) Butadiene-acrylonitrile copolymer; contains primary OH; HYCAR 1300 × 29; The B. F. Goodrich Co.
(d) MONDUR M: Mobay Chemical Corp.
(e) Polypropylene ether glycols, end capped with ethylene oxide to provide primary hydroxyl groups. MW about 2200.
(f) Poly(tetramethylene) ether glycols, MW about 2000 and 3000, respectively, TERACOL, duPont.
(g) Polybutadiene diol, molecular weight about 2800; contains primary OH; liquid; R-45HT, Arco Chemical.
(h) Charged 15% but part of Poly Bd apparently phase separated.

We claim:

1. The method which comprises reacting together copolymerizable components consisting essentially of
   I. At least one initiator compound having the formula

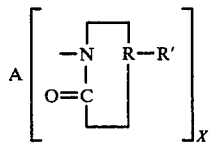

where A is B(NHCO)$_X$, B(CO)$_X$, —CO—, —SO$_2$—, —CS—,

B(CS)$_X$, B(SO$_2$)$_X$ and B(PO)$_{X/2}$, where B is a C$_4$ to C$_{30}$, or a C$_6$ to C$_{15}$, hydrocarbon radical selected from the group consisting of alkylene, cycloalkylene, alkcycloalkylene, arylene, alkarylene and aralkylene radicals and mixtures thereof, where X is 2 to 4 and where R is an alkylene radical of from 4 to 11 carbon atoms and R' is hydrogen or an alkyl radical of from 1 to 4 carbon atoms,
   II. at least one liquid nitrile copolymer having an average of from about 2 to 3 hydroxyl groups per molecule and an average molecular weight of from about 1,500 to 10,000, said copolymer being a copolymer of from about 95 to 60 parts by weight of at least one conjugated diene of from 4 to 6 carbon atoms and from 5 to 40 parts by weight of at least one nitrile selected from the group consisting of acrylonitrile and methacrylonitrile and
   III. at least one lactam monomer in admixture with
   IV. at least one anionic lactam polymerization catayst in an amount of from about 1 to 20 meq., or from about 5 to 15 meq., of lactamate anion per 100 grams of I, II and III,
   the molar amount of III being substantially greater than the molar amounts of I and II, at a time, temperature and pressure sufficient to form a solid polyamide V,
   the lactam of III and IV having the formula

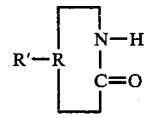

where R is an alkylene radical of from 4 to 11 carbon atoms and R' is hydrogen or an alkyl radical of from 1 to 4 carbon atoms, the equivalent ratio of the lactamate anion of the catalyst IV to the initiator compound I being from about 0.1:1 to 1:1 or from about 0.3:1 to 1:1, the equivalent ratio of the initiator compound I to the OH groups of the nitrile copolymer II being from about 0.8:1 to 4:1 or from about 1:1 to 3:1 and the nitrile copolymer II being used in an amount sufficient to provide from about 5 to 40% by weight of II copolymerized in the resulting polyamide V.

2. The method according to claim 1 where
   I is the reaction product of epsilon caprolactam and 4,4'-diphenylmethane diisocyanate or hydrogenated 4,4'diphenylmethane diisocyanate or mixture thereof in an excess of epsilon caprolactam,
   II is a copolymer of butadiene-1,3 and acrylonitrile,
   III is epsilon caprolactam and
   IV is prepared from ethyl magnesium bromide or butyl lithium and epsilon caprolactam.

3. The product produced by the method of claim 1.

4. The product produced by the method of claim 2.

5. A solid polyamide consisting essentially of (1) a lactam having an alkylene chain of from 4 to 15 carbon atoms between amide groups and (2) copolymerized with said lactam, from about 5 to 40% by weight of said solid polyamide, a liquid nitrile copolymer having (a) an average of from about 2 to 3 hydroxyl groups per molecule, (b) an average molecular weight of from about 1,500 to 10,000 and (c) from about 95 to 60 parts by weight of at least one conjugated diene of from 4 to 6 carbon atoms and from 5 to 40 parts by weight of at least one nitrile selected from the group consisting of acrylonitrile and methacrylonitrile.

6. A solid polyamide according to claim 5 where said chain is a chain of 5 carbon atoms, said diene is butadiene-1,3 and said nitrile is acrylonitrile.

* * * * *

UNITED STATES PATENT AND TRADEMARK OFFICE
CERTIFICATE OF CORRECTION

PATENT NO. : 4,414,362
DATED : November 8, 1983
INVENTOR(S) : Gerd M. Lenke et al It is certified that error appears in the above-identified patent and that said Letters Patent are hereby corrected as shown below:

Column 9, line 58, after "polymerization" delete "catayst" and add ---catalyst---.

Signed and Sealed this

Tenth Day of January 1984

[SEAL]

Attest:

GERALD J. MOSSINGHOFF

Attesting Officer

Commissioner of Patents and Trademarks